(12) United States Patent
Hwang et al.

(10) Patent No.: US 11,682,496 B2
(45) Date of Patent: Jun. 20, 2023

(54) APPARATUS FOR TREATING WASTE OF NUCLEAR REACTOR PRESSURE VESSEL, AND METHOD FOR TREATING WASTE OF NUCLEAR REACTOR PRESSURE VESSEL

(71) Applicant: KOREA HYDRO & NUCLEAR POWER CO., LTD., Gyeongju-si (KR)

(72) Inventors: Young Hwan Hwang, Daejeon (KR); Mi-Hyun Lee, Daejeon (KR); Seok-Ju Hwang, Daejeon (KR); Cheon-Woo Kim, Daejeon (KR)

(73) Assignee: KOREA HYDRO & NUCLEAR POWER CO., LTD., Gyeongju-si (KR)

( * ) Notice: Subject to any disclaimer, the term of this patent is extended or adjusted under 35 U.S.C. 154(b) by 151 days.

(21) Appl. No.: 17/256,755

(22) PCT Filed: Jul. 3, 2019

(86) PCT No.: PCT/KR2019/008126
§ 371 (c)(1),
(2) Date: Dec. 29, 2020

(87) PCT Pub. No.: WO2020/009469
PCT Pub. Date: Jan. 9, 2020

(65) Prior Publication Data
US 2021/0287816 A1    Sep. 16, 2021

(30) Foreign Application Priority Data
Jul. 6, 2018    (KR) .......................... 10-2018-0078951

(51) Int. Cl.
*G21D 1/00*    (2006.01)
*G21C 1/08*    (2006.01)
(Continued)

(52) U.S. Cl.
CPC ............ *G21D 1/003* (2013.01); *G21C 1/086* (2013.01); *G21F 9/28* (2013.01); *B08B 9/035* (2013.01); *G21C 19/20* (2013.01)

(58) Field of Classification Search
CPC . G21D 1/003; G21C 9/20; G21C 9/26; G21C 9/28; G21C 9/32; G21C 9/34; F22B 837/483; F28G 9/00; B08B 9/035
See application file for complete search history.

(56) References Cited

U.S. PATENT DOCUMENTS 4,595,419 A * 6/1986 Patenaude ............... G21F 9/005
134/1
4,610,838 A * 9/1986 Gasparro ............... G21C 19/30
376/248
(Continued)

FOREIGN PATENT DOCUMENTS

EP    0435486        7/1991
EP    2446445 B1 *  6/2013 ............. G21C 17/01
(Continued)

OTHER PUBLICATIONS

Epo, Extended European Search Report of the corresponding European Patent Application No. 19830456.0. dated Mar. 4, 2022.

*Primary Examiner* — Lily C Garner
(74) *Attorney, Agent, or Firm* — Lex IP Meister, PLLC

(57) ABSTRACT

An apparatus for treating waste of a nuclear reactor pressure vessel includes: a suction unit inserted into the nuclear reactor pressure vessel through a plurality of through-pipes passing through a lower portion of the nuclear reactor pressure vessel to suck waste inside the nuclear reactor pressure vessel; a waste treatment part connected to the suction unit to treat the waste; and a lower collection part (Continued)

connected to the waste treatment part to be positioned under the nuclear reactor pressure vessel with the suction unit therebetween.

7 Claims, 3 Drawing Sheets

(51) Int. Cl.
*G21F 9/28* (2006.01)
*G21C 19/20* (2006.01)
*B08B 9/035* (2006.01)

(56) References Cited

U.S. PATENT DOCUMENTS

| | | | | |
|---|---|---|---|---|
| 4,720,369 | A * | 1/1988 | Cadaureille | G21C 17/108 376/248 |
| 4,867,941 | A * | 9/1989 | Le Dantec | G21C 17/108 376/316 |
| 6,308,774 | B1 * | 10/2001 | Kramer | G21F 9/001 165/95 |
| 7,493,938 | B2 * | 2/2009 | Majarais | F28G 9/00 165/95 |
| 7,789,966 | B2 * | 9/2010 | Kramer | F28G 1/163 134/8 |
| 8,607,401 | B2 * | 12/2013 | Hozumi | G21C 19/207 15/304 |
| 9,053,828 | B2 | 6/2015 | Newton et al. | |

FOREIGN PATENT DOCUMENTS

| | | | | |
|---|---|---|---|---|
| FR | 2698713 | A1 * | 6/1994 | ............ G21C 17/10 |
| JP | 09-203789 | | 8/1997 | |
| JP | 2000-097593 | | 4/2000 | |
| JP | 2000206288 | A * | 7/2000 | |
| JP | 4183714 | | 11/2008 | |
| JP | 4183714 | B2 * | 11/2008 | |
| JP | 2013-520663 | | 6/2013 | |
| JP | 2015-10947 | | 1/2015 | |
| JP | 2016-200401 | | 12/2016 | |
| JP | 2017-227496 | | 12/2017 | |
| KR | 830003780 | | 6/1983 | |
| KR | 10-1983-0001870 | | 9/1983 | |
| KR | 830001870 | B1 * | 9/1983 | |
| KR | 10-2000-0017385 | | 3/2000 | |
| KR | 10-2012-0121390 | | 11/2012 | |
| KR | 10-2015-0118698 | | 10/2015 | |
| KR | 2015-0118698 | | 10/2015 | |
| KR | 20150118698 | A * | 10/2015 | |
| WO | 2001/069609 | | 9/2001 | |
| WO | WO-2019016327 | A1 * | 1/2019 | ............ B01J 8/0025 |

* cited by examiner

APPARATUS FOR TREATING WASTE OF NUCLEAR REACTOR PRESSURE VESSEL, AND METHOD FOR TREATING WASTE OF NUCLEAR REACTOR PRESSURE VESSEL

TECHNICAL FIELD

This description relates to an apparatus for treating waste of a nuclear reactor pressure vessel and a method for treating waste of a nuclear reactor pressure vessel.

BACKGROUND ART

Generally, among nuclear facilities used for nuclear power generation, a pressurized water reactor type of nuclear power plant includes a nuclear reactor pressure vessel, an in-core instrument (ICI) nozzle for measuring the inside of the nuclear reactor pressure vessel through a lower portion of the nuclear reactor pressure vessel, and bio-protective concrete for surrounding the nuclear reactor pressure vessel and the in-core instrument nozzle.

When decommissioning a nuclear facility, in order to easily separate the nuclear reactor pressure vessel from the bio-protective concrete, it is necessary to separate the in-core instrument nozzle from the nuclear reactor pressure vessel and to separate waste inside the nuclear reactor pressure vessel from the nuclear reactor pressure vessel.

DISCLOSURE

Technical Problem

An embodiment provides an apparatus for treating waste of a nuclear reactor pressure vessel and a method for treating waste of a nuclear reactor pressure vessel that easily treat waste inside a nuclear reactor pressure vessel when decommissioning a nuclear facility.

Technical Solution

An embodiment provides an apparatus for treating waste of a nuclear reactor pressure vessel including: a suction unit inserted into the nuclear reactor pressure vessel through a plurality of through-pipes passing through a lower portion of the nuclear reactor pressure vessel to suck waste inside the nuclear reactor pressure vessel; a waste treatment part connected to the suction unit to treat the waste; and a lower collection part connected to the waste treatment part to be positioned under the nuclear reactor pressure vessel with the suction unit therebetween.

The suction unit may include a plurality of inserts inserted into the nuclear reactor pressure vessel through the plurality of through-pipes, and the plurality of inserts are flexible sucking members sucking the waste.

The plurality of inserts may further include a camera, a radiation meter, a manipulator, a chemical injector, a stirrer, an ultrasonic generator, and an air injector.

The lower collection part may collect waste falling through the plurality of through-pipes from the inside of the nuclear reactor pressure vessel.

In addition, another embodiment provides a method for treating waste of a nuclear reactor pressure vessel, including: inserting a suction unit into the nuclear reactor pressure vessel through a plurality of through-pipes passing through a lower portion of the nuclear reactor pressure vessel; sucking waste inside the nuclear reactor pressure vessel by using the suction unit; collecting waste falling from the inside of the nuclear reactor pressure vessel through the plurality of through-pipes into a lower collection part positioned under the nuclear reactor pressure vessel with the suction unit therebetween; and treating the waste and the falling waste by using a waste treatment part connected to the suction unit and the lower collection part.

The inserting of the suction unit may include inserting a plurality of inserts included in the suction unit into the nuclear reactor pressure vessel through the plurality of through-pipes, and the sucking of the waste may include sucking the waste inside the nuclear reactor pressure vessel by using a flexible sucking member included in the plurality of inserts.

The sucking of the waste may further include: identifying a solid contained in the waste inside the nuclear reactor pressure vessel by using a camera included in the plurality of inserts; physically crushing the solid contained in the waste by using a manipulator included in the plurality of inserts; chemically dissolving the solid contained in the waste by using a chemical injector included in the plurality of inserts; and stirring the waste by using a stirrer and an ultrasonic generator included in the plurality of inserts.

Advantageous Effects

According to the embodiment, an apparatus for treating waste of a nuclear reactor pressure vessel and a method for treating waste of a nuclear reactor pressure vessel that easily treat waste inside a nuclear reactor pressure vessel when decommissioning a nuclear facility are provided.

MODE FOR INVENTION

The present invention will be described more fully hereinafter with reference to the accompanying drawings, in which embodiments of the invention are shown. As those skilled in the art would realize, the described embodiment may be modified in various different ways, all without departing from the spirit or scope of the present.

In addition, unless explicitly described to the contrary, the word "comprise" and variations such as "comprises" or "comprising" will be understood to imply the inclusion of stated elements but not the exclusion of any other elements.

Hereinafter, a method for treating waste of a nuclear reactor pressure vessel according to an embodiment will be described with reference to FIG. 1 and FIG. 2.

Hereinafter, a nuclear reactor pressure vessel included in a pressurized water reactor type (PWR) nuclear power plant as a nuclear reactor pressure vessel is described as an example, but is not limited thereto, and the nuclear reactor pressure vessel may be a nuclear reactor pressure vessel included in a boiling water reactor (BWR) type of nuclear power plant.

A pressurized water reactor type of nuclear power plant uses light water as a coolant and a moderator, and uranium 235 is concentrated to about 2% to 4% to be used as nuclear fuel. A pressurized light-water reactor type of nuclear power plant is divided into a facility related to a nuclear reactor system that transmits heat generated by nuclear fission within a reactor to a steam generator for heat exchange; and a facility related to a turbine and generator system that turns a turbine with steam generated from the steam generator, returns it to water through a condenser, and then circulates it back to the steam generator.

Generally, a coolant (light water), which is a heat transfer medium of a nuclear reactor system, is heated to about 320° C. in a nuclear reactor and pressurized to about 153 atmospheres so that it does not boil. Equipment configuring the system includes a pressurizer that adjusts pressure to maintain constant enthalpy, and a coolant pump that circulates the coolant between the reactor and the steam generator. A system in which the steam generated from the steam generator rotates the turbine to generate power from a generator connected to a turbine shaft may be the same as that of a general thermal power plant.

Figure 1:
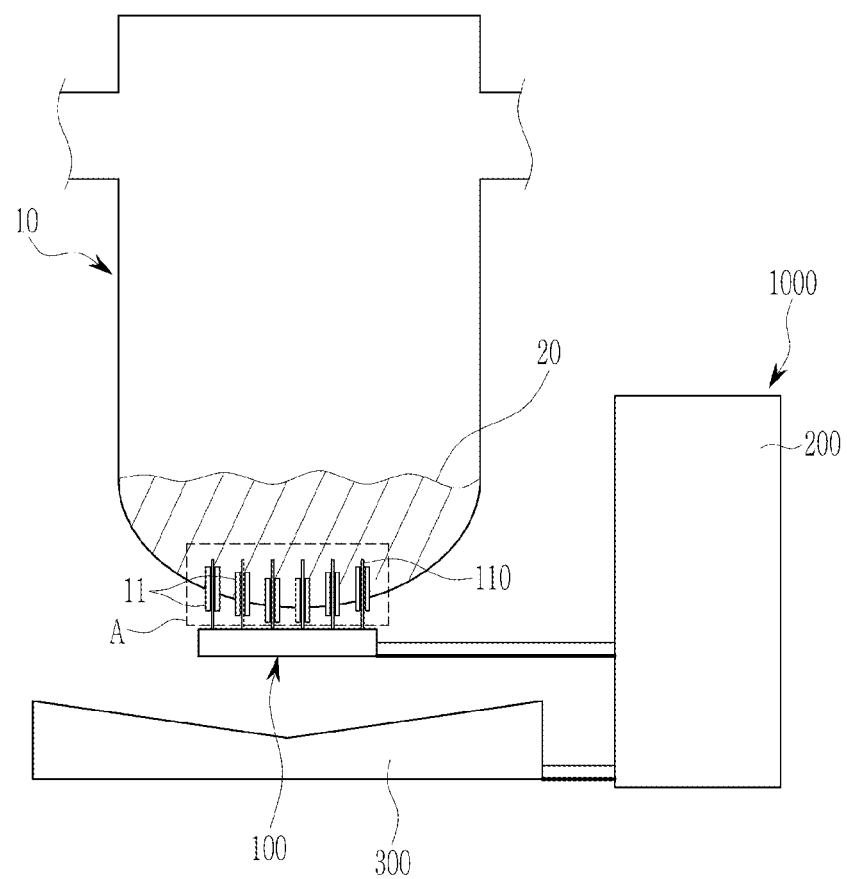
FIG. 1 illustrates a schematic view of an apparatus for treating waste of a nuclear reactor pressure vessel according to an embodiment.

FIG. 1 illustrates a schematic view of an apparatus for treating waste of a nuclear reactor pressure vessel according to an embodiment.

Referring to FIG. 1, a waste treatment apparatus 1000 of a nuclear reactor pressure vessel according to an embodiment sucks and treats waste 20 inside a nuclear reactor pressure vessel 10 through a plurality of through-pipes 11 passing through a lower portion of the nuclear reactor pressure vessel 10 when a nuclear facility is decommissioned.

Here, the plurality of through-pipes 11 passing through the lower portion of the nuclear reactor pressure vessel 10 may be through-pipes guiding an in-core instrument (ICI) nozzle that passes through the lower portion of the nuclear reactor pressure vessel 10 and measures the inside of the nuclear reactor pressure vessel 10, and the in-core instrument nozzle is in a state of being separated from the nuclear reactor pressure vessel 10. The nuclear reactor pressure vessel 10 may be supported on a bio-protective concrete, but is not limited thereto.

The apparatus 1000 for treating the waste of the nuclear reactor pressure vessel includes a suction unit 100, a waste treatment part 200, and a lower collection part 300.

The suction unit 100 is positioned under the nuclear reactor pressure vessel 10. The suction unit 100 is inserted into the nuclear reactor pressure vessel 10 through the plurality of through-pipes 11 passing through the lower portion of the nuclear reactor pressure vessel 10 to suck the waste 20 inside the nuclear reactor pressure vessel 10. The suction unit 100 is connected to the waste treatment part 200, and the waste 20 sucked by the suction unit 100 is moved to the waste treatment part 200 to be treated in the waste treatment part 200.

Here, the treatment in the waste treatment part 200 may mean decontamination of the waste 20 or storing the waste 20 in a waste storage container, but is not limited thereto.

The suction unit 100 includes a plurality of inserts 110 inserted into the nuclear reactor pressure vessel 10 through the plurality of through-pipes 11.

Figure 2:
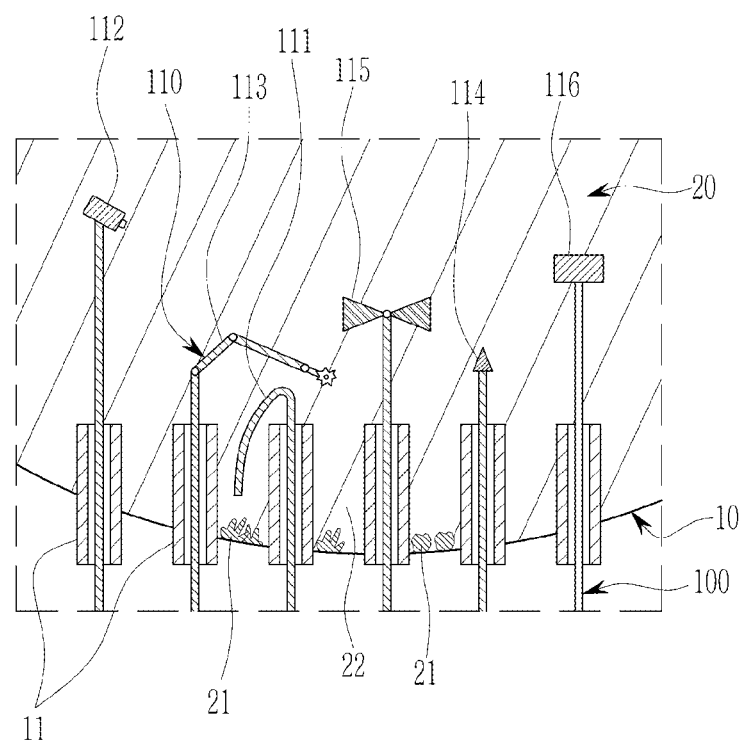
FIG. 2 illustrates a schematic view of a portion A of FIG. 1.

FIG. 2 illustrates a schematic view of a portion A of FIG. 1.

Referring to FIG. 2, the plurality of inserts 110 include a flexible sucking member 111, a camera 112, a radiation meter (not shown), a manipulator 113, a chemical injector 114, a stirrer 115, an ultrasonic generator 116, and an air injector (not shown).

The flexible sucking member 111 is flexible and is inserted into the nuclear reactor pressure vessel 10 through the through-pipes 11 to suck the waste 20 inside the nuclear reactor pressure vessel 10.

Here, the waste 20 may be cooling water inside the nuclear reactor pressure vessel 10 and a reaction product remaining after reaction in a core of the nuclear reactor pressure vessel 10, and the waste 20 includes a solid 21 and a liquid 22. The solid 21 may have a form such as crud or sludge, but is not limited thereto.

The flexible sucking member 111 may be various types of known sucking members as long as it may be inserted into the nuclear reactor pressure vessel 10 through the through-pipes 11 to be flexibly moved to suck the waste 20.

The camera 112 is inserted into the nuclear reactor pressure vessel 10 through the through-pipes 11 to check the inside of the nuclear reactor pressure vessel 10. The camera 112 may check a position of the solid 21 contained in the waste 20, but is not limited thereto.

The camera 112 may be various types of known cameras as long as it may be inserted into the nuclear reactor pressure vessel 10 through the through-pipes 11 to check the inside of the nuclear reactor pressure vessel 10.

The radiation meter is inserted into the nuclear reactor pressure vessel 10 through the through-pipes 11 to measure radiation concentration inside the nuclear reactor pressure vessel 10. The radiation meter may be various types of known radiation meters as long as it may be inserted into the nuclear reactor pressure vessel 10 through the through-pipes 11 to check radiation concentration inside the nuclear reactor pressure vessel 10.

The manipulator 113 is inserted into the nuclear reactor pressure vessel 10 through the through-pipes 11 to physically crush the solid 21 of the waste 20 inside the nuclear reactor pressure vessel 10. Various end effectors for crushing the solids 21 of the waste 20 may be positioned at an end portion of the manipulator 113. For example, the end effector of the manipulator 113 may be a rotation saw, but is not limited thereto, and it may be various types of known end effectors as long as it may crush the solid 21 of the waste 20.

The manipulator 113 may be various types of known manipulators as long as it may be inserted into the nuclear reactor pressure vessel 10 through the through-pipes 11 to physically crush the solid 21 of the waste 20 inside the nuclear reactor pressure vessel 10.

The chemical injector 114 is inserted into the nuclear reactor pressure vessel 10 through the through-pipes 11 to chemically dissolve the solid 21 of the waste 20 inside the nuclear reactor pressure vessel 10. The chemical injector 114 may inject various known chemicals that may chemically dissolve the solid 21 of the waste 20 inside the nuclear reactor pressure vessel 10.

The chemical injector 114 may be various types of known chemical injectors as long as it may be inserted into the nuclear reactor pressure vessel 10 through the through-pipes 11 to chemically dissolve the solid 21 of the waste 20 inside the nuclear reactor pressure vessel 10.

The stirrer 115 is inserted into the nuclear reactor pressure vessel 10 through the through-pipes 11 to stir the waste 20 inside the nuclear reactor pressure vessel 10. The stirrer 115 stirs the waste 20 and mixes the crushed material or dissolved material of the solid 21 contained in the waste 20 with the liquid 22 contained in the waste 20.

The stirrer 115 may be various types of known stirrers as long as it may be inserted into the nuclear reactor pressure vessel 10 through the through-pipes 11 to stir the waste 20 inside the nuclear reactor pressure vessel 10.

The ultrasonic generator 116 is inserted into the nuclear reactor pressure vessel 10 through the through-pipes 11 to generate an ultrasonic wave to the waste 20 inside the nuclear reactor pressure vessel 10. The ultrasonic generator 116 may generate an ultrasonic wave to the waste 20 to mix the crushed material or dissolved material of the solid 21 contained in the waste 20 with the liquid 22 contained in the waste 20. When the crushed material or dissolved material of the solid 21 is stirred with the liquid 22, the stirred waste 20 may have a form of a slurry, and the stirred waste be sucked by using the flexible sucking member 111.

The ultrasonic generator 116 may be various types of known ultrasonic generators as long as it may be inserted into the nuclear reactor pressure vessel 10 through the through-pipes 11 to generate an ultrasonic wave to the waste 20 inside the nuclear reactor pressure vessel 10.

The air injector (not shown) is inserted into the nuclear reactor pressure vessel 10 through the through-pipes 11 to inject air into the waste 20 inside the nuclear reactor pressure vessel 10.

Due to the air injected from the air injector (not shown), the crushed or dissolved material of the solid 21 contained in the waste 20 may be mixed with the liquid 22 contained in the waste 20, and the waste 20 remaining at a bottom portion of the nuclear reactor pressure vessel 10 may be moved to a predetermined position.

The waste 20 that is confirmed by the camera 112 and is treated as described above by the manipulator 113, the chemical injector 114, the stirrer 115, the ultrasonic generator 116, and the air injector (not shown) may be sucked by the flexible sucking member 111 to be moved to the waste treatment part 200.

Referring back to FIG. 1, the waste treatment part 200 is connected to the suction unit 100 and the lower collection part 300. The waste treatment part 200 treats the waste 20 sucked by the suction unit 100 and the falling waste collected by the lower collection part 300.

For example, the waste treatment part 200 may decontaminate the waste 20, or may store the waste 20 in a waste storage container.

The lower collection part 300 is positioned under the nuclear reactor pressure vessel 10 with the suction unit 100 interposed therebetween. The lower collection part 300 overlaps the nuclear reactor pressure vessel 10, and has a two-dimensionally larger area than the suction unit 100.

When the suction unit 100 sucks the waste 20 inside the nuclear reactor pressure vessel 10, the lower collection part 300 collects the falling waste falling from the inside of the nuclear reactor pressure vessel 10 through the plurality of through-pipes 11.

The lower collection part 300 is connected to the waste treatment part 200, and the falling waste collected by the lower collection part 300 is moved to the waste treatment part 200 and treated in the waste treatment part 200.

As described above, according to the apparatus 1000 for treating the waste of the nuclear reactor pressure vessel according to the embodiment, when the waste 20 inside the nuclear reactor pressure vessel 10 is treated, without forming a separate hole in the nuclear reactor pressure vessel 10, the waste 20 inside the nuclear reactor pressure vessel 10 is sucked through the through-pipes 11 for guiding the in-core instrument (ICI) nozzle by using the suction unit 100 to be treated by the waste treatment part 200, so that a separate additional process and equipment for changing a structure of the nuclear reactor pressure vessel 10 is not required.

In addition, when treating the waste 20 inside the nuclear reactor pressure vessel 10, the apparatus 1000 for treating the waste of the nuclear reactor pressure vessel according to the embodiment uses the camera 112, the manipulator 113, the chemical injector 114, the stirrer 115, the ultrasonic generator 116, and the air injector (not shown) included in the inserts 110 of the suction unit 100 to check the position of the solid 21 of the waste 20 to physically crush or chemically dissolve it to stir it with the liquid 22, so that the waste 20 is easily sucked by using the flexible sucking member 111 included in the inserts 110 to be transferred to the waste treatment part 200, and thus the waste 20 may be easily treated in the waste treatment part 200.

In addition, according to the apparatus 1000 for treating the waste of the nuclear reactor pressure vessel according to the embodiment, when the waste 20 inside the nuclear reactor pressure vessel 10 is sucked by using the suction unit 100, since the falling waste falling from the inside of the nuclear reactor pressure vessel 10 through the plurality of through-pipes 11 is collected by the lower collection part 300 and transferred to the waste treatment part 200, when the waste 20 inside the nuclear reactor pressure vessel 10 is treated, contamination of the vicinity of the nuclear reactor pressure vessel 10 due to the falling waste is suppressed.

That is, the apparatus 1000 for treating the waste of the nuclear reactor pressure vessel that easily treats the waste 20 inside the nuclear reactor pressure vessel 10 when the nuclear facility is decommissioned is provided.

Hereinafter, a method for treating waste of a nuclear reactor pressure vessel according to another embodiment will be described with reference to FIG. 1 to FIG. 3.

The method for treating the waste of the nuclear reactor pressure vessel according to another embodiment may be performed by using the apparatus for treating the waste of the nuclear reactor pressure vessel according to the embodiment described above, but is not limited thereto.

Figure 3:
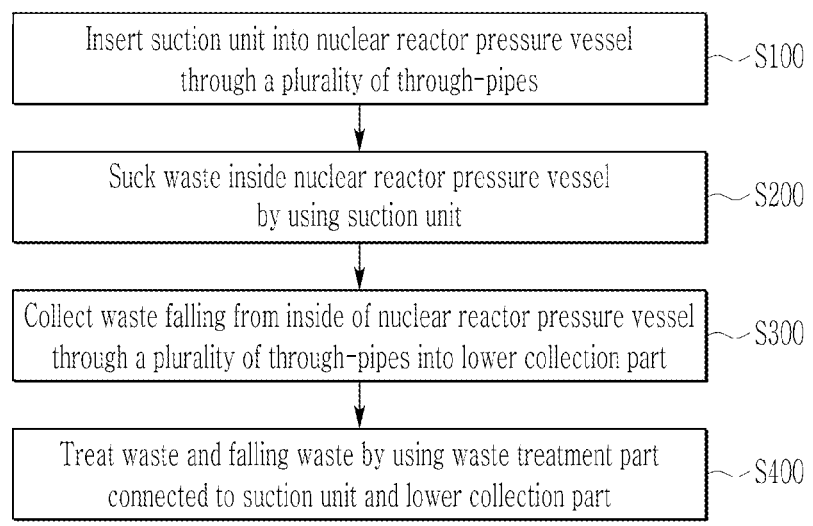
FIG. 3 illustrates a flowchart of a method for treating waste of a nuclear reactor pressure vessel according to another embodiment.

FIG. 3 illustrates a flowchart of a method for treating waste of a nuclear reactor pressure vessel according to another embodiment.

Referring to FIG. 1 to FIG. 3, first, the suction unit 100 is inserted into the nuclear reactor pressure vessel 10 through the plurality of through-pipes 11 passing through the lower portion of the nuclear reactor pressure vessel 10 (S100).

Specifically, the in-core instrument (ICI) nozzle passing through the through-pipes 11 of the lower portion of the nuclear reactor pressure vessel 10 is removed, and the through-pipes 11 are sealed.

The suction unit 100 and the lower collection part 300 are positioned under the nuclear reactor pressure vessel 10, and the inserts 110 included in the suction unit 100 are inserted into the nuclear reactor pressure vessel 10 through the through-pipes 11.

Next, the waste 20 inside the nuclear reactor pressure vessel 10 is sucked by using the suction unit 100 (S200).

Specifically, the inserts 110 included in the suction unit 100 are inserted into the nuclear reactor pressure vessel 10 through the through-pipes 11 to suck the waste 20.

First, the solid 21 contained in the waste 20 inside the nuclear reactor pressure vessel 10 is checked by using the camera 112 included in the plurality of inserts 110.

Next, the solid 21 contained in the waste 20 is physically crushed by using the manipulator 113 included in the plurality of inserts 110.

Then, the solid 21 contained in the waste 20 is chemically dissolved by using the chemical injector 114 included in the plurality of inserts 110.

Next, the waste 20 is stirred by using the stirrer 115 and the ultrasonic generator 116 included in the plurality of inserts 110 to mix the crushed material or dissolved material of the solid 21 included in the waste 20 with the liquid 22 included in the waste 20.

Next, the waste 20 inside the nuclear reactor pressure vessel 10 is sucked by using the flexible sucking member 111 included in the plurality of inserts 110.

The stirred waste 20 may be sucked by using the flexible sucking member 111, and the cooling water contained in the waste 20 may be first sucked before the solid 21 contained in the waste 20 is treated.

After the waste 20 is sucked by using the suction unit 100, the through-pipes 11 may be sealed.

Next, the falling waste 20 falling from the inside of the nuclear reactor pressure vessel 10 through the plurality of through-pipes 11 is collected by the lower collection part 300 positioned under the nuclear reactor pressure vessel 10 with the suction unit 100 interposed therebetween (S300).

When the suction unit 100 sucks the waste 20 inside the nuclear reactor pressure vessel 10, the falling waste falling from the inside of the nuclear reactor pressure vessel 10 through the plurality of through-pipes 11 is collected by using the lower collection part 300.

Next, the waste 20 and the falling waste are treated by using the waste treatment part 200 connected to the suction unit 100 and to the lower collection part 300 (S400).

Specifically, the waste 20 sucked by the suction unit 100 and the falling waste collected by the lower collection part 300 are transferred to the waste treatment part 200 connected to the suction unit 100 and to the lower collection part 300, so that the waste 20 is decontaminated or the waste 20 is stored and treated in a waste storage container.

As described above, according to the method for treating the waste of the nuclear reactor pressure vessel according to another embodiment, when the waste 20 inside the nuclear reactor pressure vessel 10 is treated, without forming a separate hole in the nuclear reactor pressure vessel 10, the waste 20 inside the nuclear reactor pressure vessel 10 is sucked through the through-pipes 11 for guiding the in-core instrument (ICI) nozzle by using the suction unit 100 to be treated by the waste treatment part 200, so that a separate additional process for changing a structure of the nuclear reactor pressure vessel 10 is not required.

In addition, when treating the waste 20 inside the nuclear reactor pressure vessel 10, the method for treating the waste of the nuclear reactor pressure vessel according to another embodiment uses the camera 112, the manipulator 113, the chemical injector 114, the stirrer 115, the ultrasonic generator 116, and the air injector (not shown) included in the inserts 110 of the suction unit 100 to check the position of the solid 21 of the waste 20 to physically crush or chemically dissolve it to stir it with the liquid 22, so that the waste 20 is easily sucked by using the flexible sucking member 111 included in the inserts 110 to be transferred to the waste treatment part 200, and thus the waste 20 may be easily treated in the waste treatment part 200.

In addition, according to the method for treating the waste of the nuclear reactor pressure vessel according to another embodiment, when the waste 20 inside the nuclear reactor pressure vessel 10 is sucked by using the suction unit 100, since the falling waste falling from the inside of the nuclear reactor pressure vessel 10 through the plurality of through-pipes 11 is collected by the lower collection part 300 and transferred to the waste treatment part 200, when the waste 20 inside the nuclear reactor pressure vessel 10 is treated, contamination of the vicinity of the nuclear reactor pressure vessel 10 due to the falling waste is suppressed.

That is, the method for treating the waste of the nuclear reactor pressure vessel that easily treats the waste 20 inside the nuclear reactor pressure vessel 10 when the nuclear facility is decommissioned is provided.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS reactor pressure vessel 10, through-pipe 11, suction unit 100, waste treatment part 200, lower collection part 300

The invention claimed is:

1. An apparatus for treating waste of a nuclear reactor pressure vessel, comprising:
   a suction unit including a plurality of inserts configured to be inserted into the nuclear reactor pressure vessel through a plurality of through-pipes passing through a lower portion of the nuclear reactor pressure vessel to suck waste inside the nuclear reactor pressure vessel, wherein each of the inserts has an end portion located in the nuclear reactor pressure vessel and out of the through-pipes;
   a waste treatment part connected to the suction unit to treat the waste and disposed beside the suction unit; and
   a lower collection part connected to the waste treatment part and positioned under the nuclear reactor pressure vessel and the inserts of the suction unit.

2. The apparatus for treating the waste of the nuclear reactor pressure vessel of claim 1, wherein
   at least one of the plurality of inserts is a flexible sucking member sucking the waste.

3. The apparatus for treating the waste of the nuclear reactor pressure vessel of claim 2, wherein
   the plurality of inserts further include a camera, a manipulator, a chemical injector, a stirrer, and an ultrasonic generator.

4. The apparatus for treating the waste of the nuclear reactor pressure vessel of claim 1, wherein
   the lower collection part collects waste falling through the plurality of through-pipes from the inside of the nuclear reactor pressure vessel.

5. A method for treating waste of a nuclear reactor pressure vessel using the apparatus of claim 1, comprising:
   inserting the suction unit into the nuclear reactor pressure vessel through the plurality of through-pipes passing through the lower portion of the nuclear reactor pressure vessel;
   sucking waste inside the nuclear reactor pressure vessel by using the suction unit;
   collecting waste falling from the inside of the nuclear reactor pressure vessel through the plurality of through-pipes into the lower collection part positioned under the nuclear reactor pressure vessel with the suction unit therebetween; and
   treating the waste and the falling waste by using the waste treatment part connected to the suction unit and the lower collection part.

6. The method for treating the waste of the nuclear reactor pressure vessel of claim 5, wherein
the inserting of the suction unit includes inserting the plurality of inserts included in the suction unit into the nuclear reactor pressure vessel through the plurality of through-pipes, and
the sucking of the waste includes
sucking the waste inside the nuclear reactor pressure vessel by using a flexible sucking member included in the plurality of inserts.

7. The method for treating the waste of the nuclear reactor pressure vessel of claim 6, wherein
the sucking of the waste further includes:
identifying a solid contained in the waste inside the nuclear reactor pressure vessel by using a camera included in the plurality of inserts;
physically crushing the solid contained in the waste by using a manipulator included in the plurality of inserts;
chemically dissolving the solid contained in the waste by using a chemical injector included in the plurality of inserts; and
stirring the waste by using a stirrer and an ultrasonic generator included in the plurality of inserts.

* * * * *